May 22, 1923.

E. BROOKS

ATTACHMENT FOR BALING PRESSES

Filed Dec. 22, 1919

Inventor
Edward Brooks

By C. H. Farben, Attorney

May 22, 1923.
E. BROOKS
ATTACHMENT FOR BALING PRESSES
Filed Dec. 22, 1919
1,456,265
3 Sheets-Sheet 2
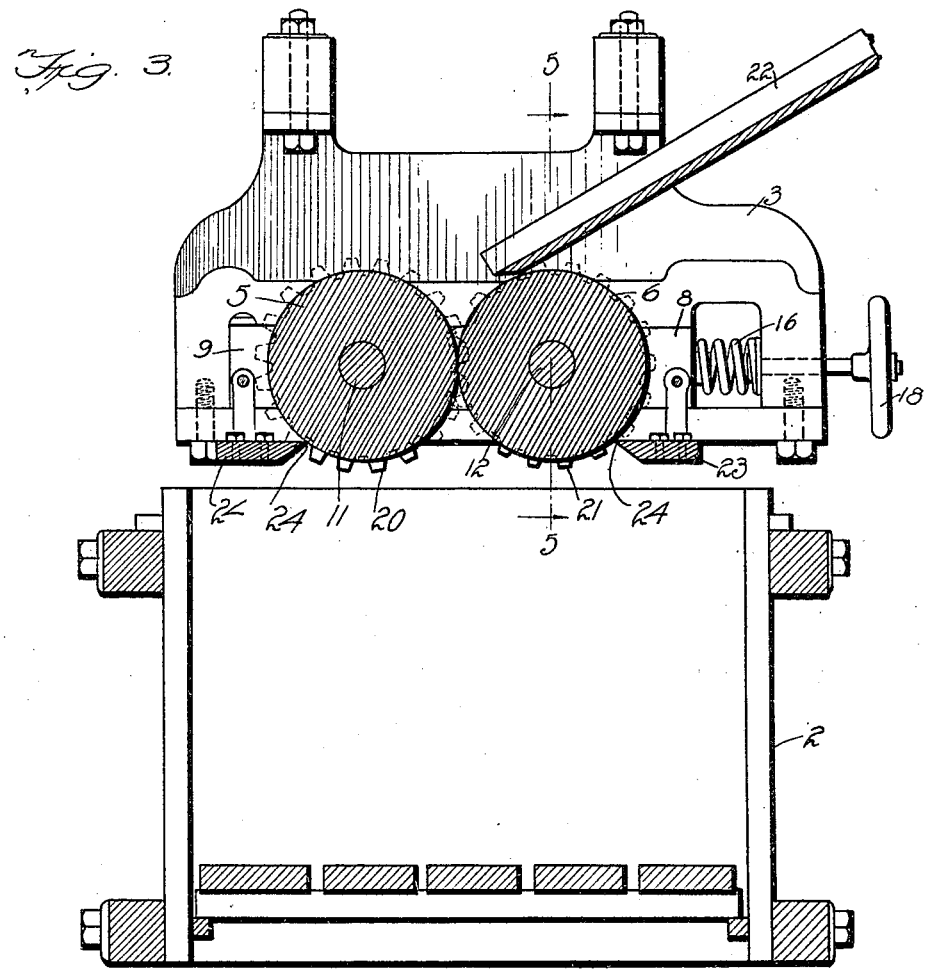
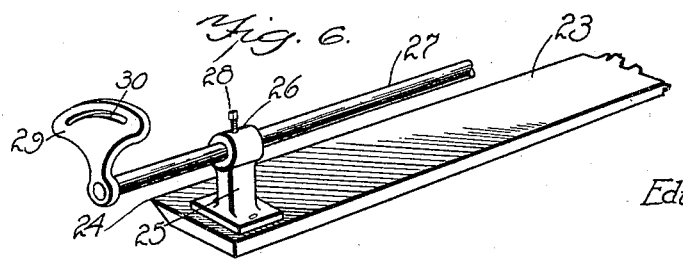
Inventor
Edward Brooks

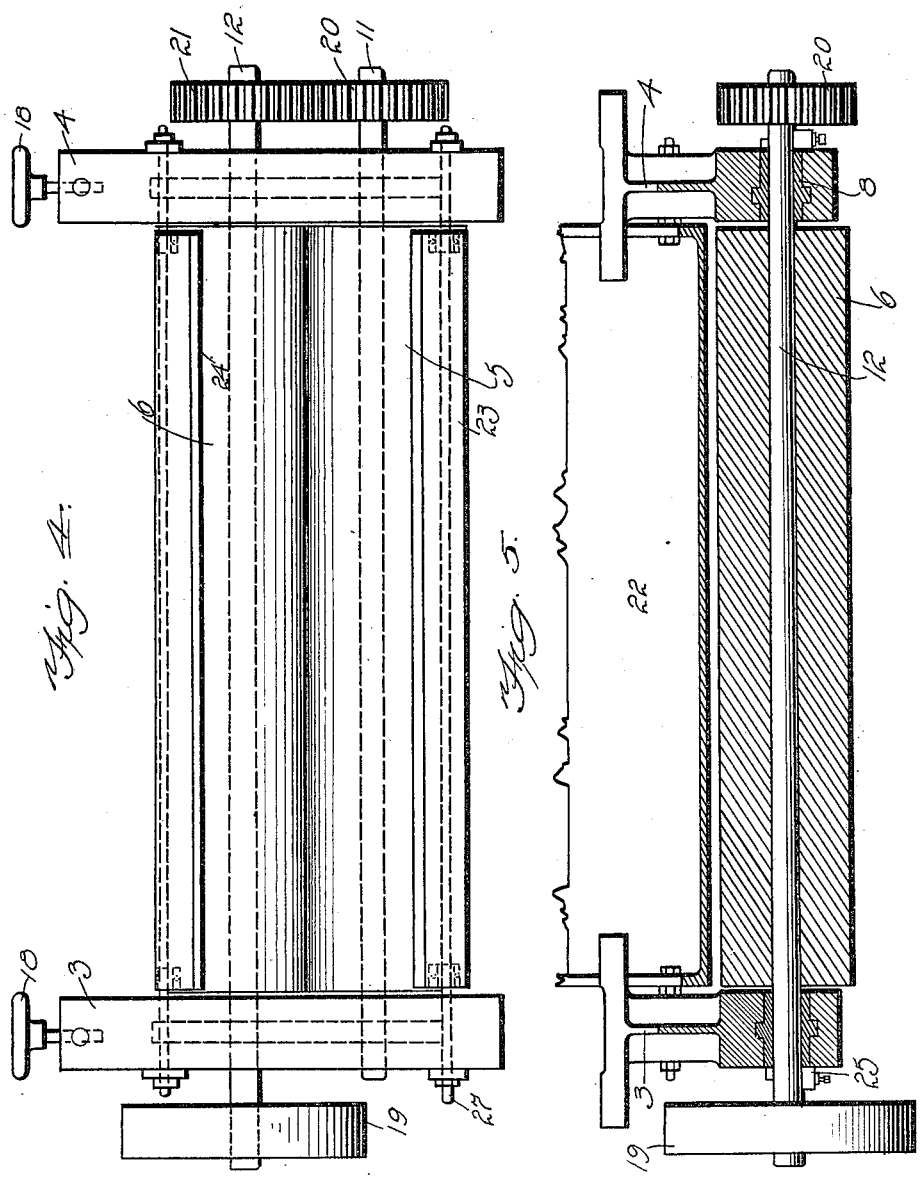

Patented May 22, 1923.

1,456,265

UNITED STATES PATENT OFFICE.

EDWARD BROOKS, OF ATLANTA, GEORGIA.

ATTACHMENT FOR BALING PRESSES.

Application filed December 22, 1919. Serial No. 346,442.

*To all whom it may concern:*

Be it known that I, EDWARD BROOKS, a citizen of the United States, residing at Atlanta, in the county of Fulton and State of Georgia, have invented certain new and useful Improvements in Attachments for Baling Presses, of which the following is a specification.

This invention relates to attachment for baling presses; and it comprises a pair of yielding rollers adapted to be positioned above the press box, said rollers being spring pressed toward each other for the purpose of causing a regular and uninterrupted feed of the material to the press-box; means for feeding the material to the rollers; and scrapers arranged to bear against said rollers to remove any material that may adhere to the surface thereof; all as more fully hereinafter set forth and as claimed.

In the use of baling presses, and particularly in baling cotton, the present method consists in placing the cotton, or other material, to be baled in a press-box and preliminarily compressing it by the use of vertically operated reciprocating plungers. After the cotton has been compressed to a certain degree, the press-box is placed in a suitable machine for final compression and baling. An object of the present invention is to eliminate the use of reciprocating plungers in the preliminary pressing and to provide means for furnishing a continuous and regular flow from the commencement of the operation until sufficient cotton has been delivered into the press-box to make a full bale. The press-box is then transferred to the usual baling machine for final operation.

A further object of the present invention is to provide a simple means for preliminarily compressing the cotton and feeding it to the press-box in a continuous flow.

In the accompanying drawings in which I have shown an embodiment of my invention, Figure 1 is a view in elevation of a baling press showing my invention applied thereto.

Figure 3 is a transverse sectional view taken on the line 3—3 of Figure 1.

Figure 4 is an end elevation of the attachment.

Figure 5 is a longitudinal sectional view taken on the line 5—5 of Figure 3, and Figure 6 is a detailed view of a scraping element and its supporting means.

Figure 1:
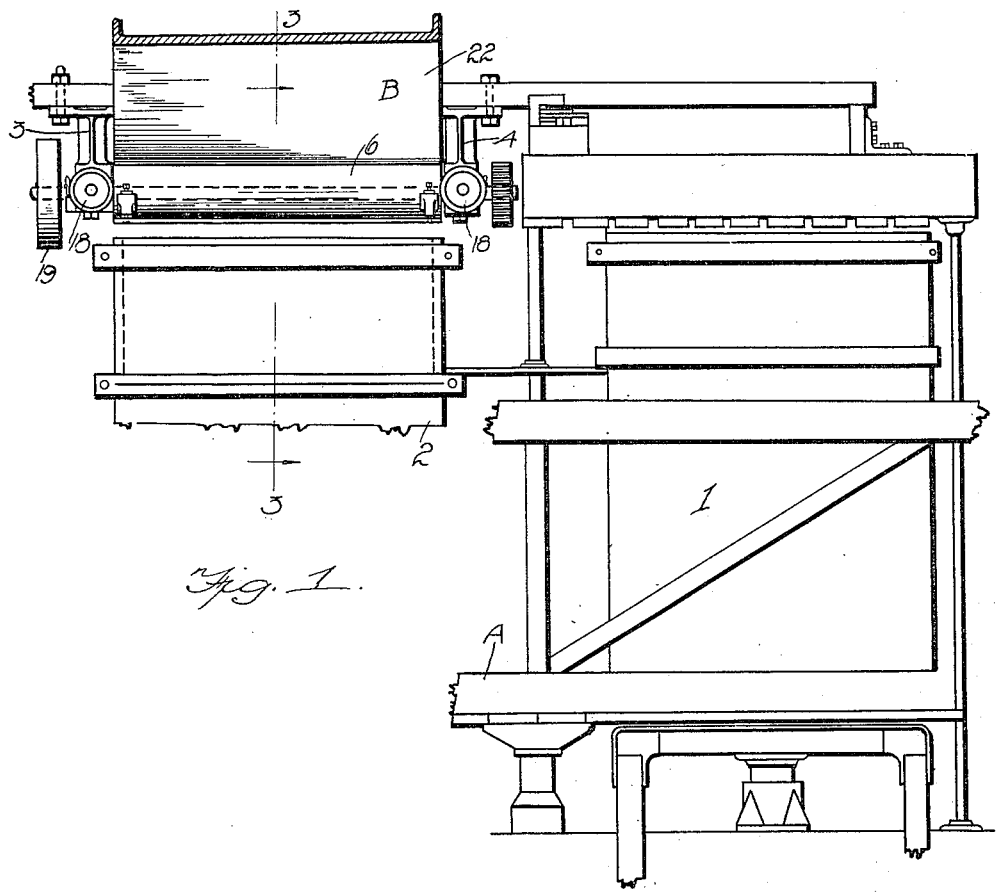

In the drawings the letter A designates generally a rotating table upon which are arranged press-boxes 1 and 2. The press-box 1 has been filled with sufficient cotton, or other material, to form a bale and is in position for the final baling process. The elements heretofore described form no part of the present invention and a further detailed description is deemed unnecessary.

Figure 2:
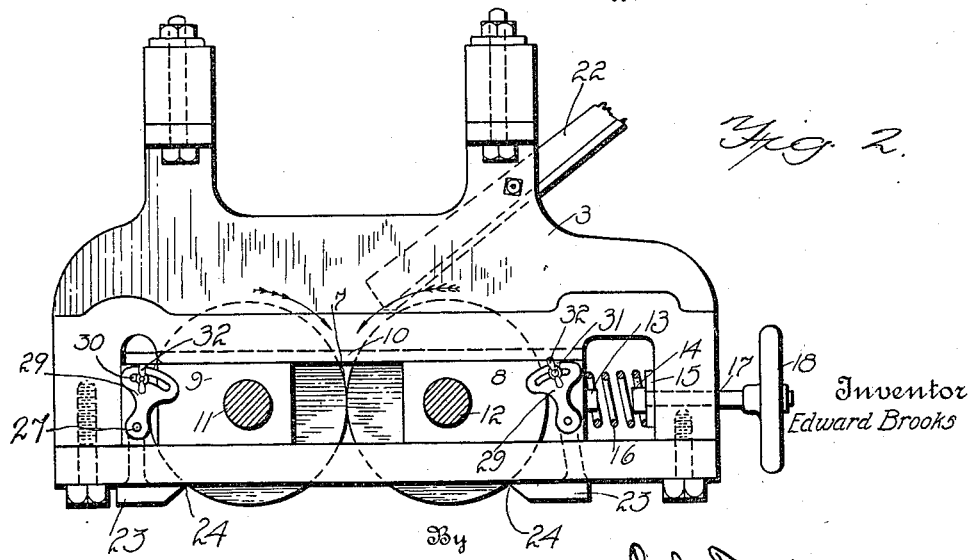
Figure 2 is a side elevation, partly in section, of the attachment.

The attachment forming the subject matter of this invention is shown in Figure 1 arranged above the press-box 2 and designated generally by the letter B. The device comprises a pair of supporting frames 3 and 4, spaced from each other for the reception of rollers 5 and 6. The supporting frames are provided with cutout portions 7 for the reception of bearing blocks 8 and 9. The bearing blocks may be held in position by a tongue-and-grooved construction shown at 10 in Figures 2 and 5. Shafts 11 and 12 are arranged in the bearing blocks and these shafts carry the rollers. Bearing block 9 may be rigidly mounted in the cutout portions of the frame work, or it may be provided with means (not shown) for maintaining it in any desired position relative to bearing block 8. Means are provided for yieldingly forcing bearing block 8 and roller 6 toward bearing block 9 and roller 5. A projection or stud 13 is formed in the remote side of the bearing block in alinement with stud 14 carried by adjustable plate 15. Coil spring 16 is arranged between the two studs and is adapted to force bearing block 8 toward the center of the frame work. The pressure of the coil spring may be adjusted by moving plate 15 toward or away from the bearing block. Plate 15 is supported on a threaded shaft 17 passing through the frame work of the machine and provided with hand-wheel 18 for adjustment.

The roller may be driven by any suitable means, and as shown, shaft 12 is provided with a pulley 19 for this purpose. On the opposite end of the shaft is arranged gear 21 meshing with the gear 20 on shaft 11 and, therefore, driving it and roller 5 in the opposite direction. An inclined feeding device or chute board 22 is suitably supported in the frame work of the machine with its delivery end arranged near the point of contact of the peripheral faces of the rollers.

Means are provided for scraping the faces of the rollers to remove any material that may adhere to the faces during the pressing operation. Similar means are employed for each roller and the description of one will suffice. Said scraping means consists of a blade or plate 23 of a length substantially equal to the width of the roller and adapted to bear against the entire face of the roller during its revolution. The scraping blade is provided with a sharpened edge 24 which facilitates the removal of adhering material. Standards 25 are secured to the upper side of the scraping blade and are provided with bearings 26 upon their opposite ends. Shaft 27 mounted in one of the bearing blocks passes through bearing 26 and is held rigidly therewith by set screw 28. It will thus be seen that the scraping element will move in the arc of a circle when shaft 27 is revolved and is thus adjustable with respect to the face of the roller.

This adjustment is obtained by means of segmental plates 29 carried on the ends of shafts 27 and rigidly secured thereto. The plate is provided with an arcuate slot 30 through which passes a threaded screw 31 arranged on the bearing block. Wing nut 32 is provided for maintaining the plate in adjusted position. It will thus be seen that by moving the segmental plate, shaft 27 is revolved and the scraping element adjusted with respect to the roller. When proper adjustment has been obtained, the scraping element may be held in adjusted position by tightening wing nut 32.

In operation, an empty press-box is placed beneath the attachment as shown at 2 in Figure 1 and the cotton to be baled is fed to the machine by an inclined chute board 22. The rollers revolve in opposite directions, feeding the cotton into the press-box in a regular stream and preliminarily compressing it. Spring 16 permits roller 6 to yield or give sufficiently to allow the cotton to pass into the press-box, but, at the same time, exerts sufficient pressure to cause considerable compression of the cotton. It has been found that the compression thus obtained is at least equal to the preliminary compression obtained in pressing by the use of reciprocating plungers prior to the final baling operation. When sufficient cotton has been passed into the press-box 2 to form a bale, the press-box is removed for final operation and another submitted.

In the accompanying drawings I have shown a single embodiment of this invention and it is to be understood that various changes and modifications may be made in the detailed construction without departing from the spirit of this invention.

What I claim is:

1. A rotary feeding and packing device comprising a frame, a rotatable roller journaled in said frame, means for scraping said roller, a pair of slidable bearings mounted in opposite sides of said frame, a second roller journaled in said bearings, means for rotating said rollers, an oscillating scraper for said second named roller carried by said bearings, and adjusting means connected between said scraper and one of said bearings.

2. A rotary feeding and packing device comprising a frame, a rotatable roller journaled in said frame, means for scraping said roller, a pair of slidable bearings mounted in opposite sides of said frame, a second roller journaled in said bearings, means for rotating said rollers, an oscillating shaft having its opposite ends mounted in said bearings, a scraper carried by said shaft and adapted to contact with said second named roller, and means connected between said oscillating shaft and one of said bearings for adjusting said scraper.

In testimony whereof I affix my signature in presence of two witnesses.

EDWARD BROOKS.

Witnesses:
L. R. OEOLN,
B. W. FAUST.